Figure 1:
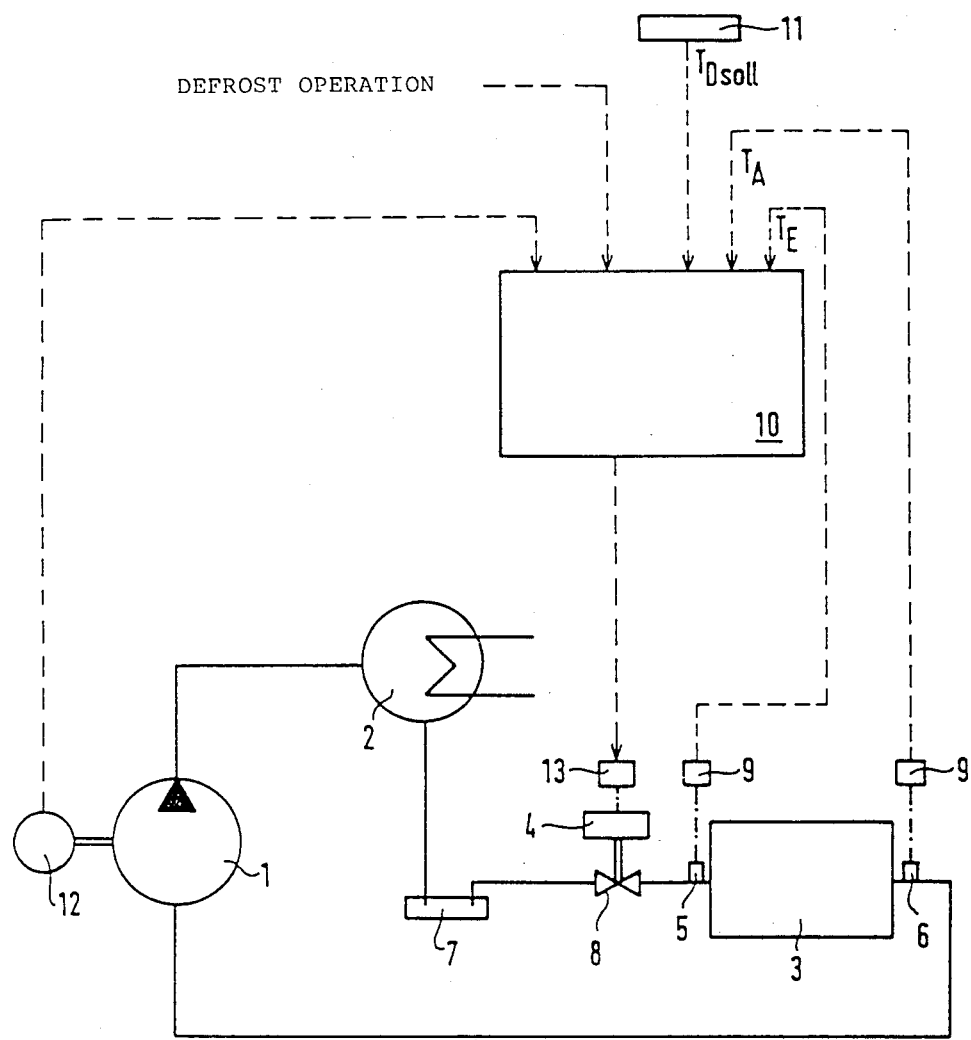

United States Patent [19]
Gras et al.

[11] Patent Number: 4,787,213
[45] Date of Patent: Nov. 29, 1988

[54] REGULATING MECHANISM FOR THE REFRIGERANT FLOW TO THE EVAPORATOR OR REFRIGERATING SYSTEMS OR HEAT PUMPS AND EXPANSION VALVES ARRANGED IN THE REFRIGERANT FLOW

[75] Inventors: Horst Gras, Neuffen; Herbert Blaich, Fellbach, both of Fed. Rep. of Germany

[73] Assignee: Otto Egelhof GmbH & Co., Fellbach, Fed. Rep. of Germany

[21] Appl. No.: 940,027

[22] Filed: Dec. 9, 1986

[30] Foreign Application Priority Data

Jan. 22, 1986 [DE] Fed. Rep. of Germany ....... 3601817

[51] Int. Cl.<sup>4</sup> ............................................. F25B 41/00
[52] U.S. Cl. ......................................... 62/212; 236/75
[58] Field of Search .................... 62/212, 225, 224; 236/75

[56] References Cited

U.S. PATENT DOCUMENTS 4,523,435 6/1985 Lord ...................................... 62/212
4,674,292 6/1987 Ohya et al. ........................ 62/225 X Primary Examiner—William E. Wayner
Attorney, Agent, or Firm—Michael J. Striker

[57] ABSTRACT

An expansion valve (8), which is arranged between the condenser (2) and the evaporator (3) in the pump medium circulation system of the heat pump and is continuously controllable, is regulated as a function of set values by means of a computer (10), in particular, while taking into account the evaporator input temperature measured by means of sensing devices (5) and/or the evaporator output temperature measured by means of sensing devices (6). Because of the regulating by means of computers, the control is suitable for different heat pumps and/or conditions of use without structurally altering the expansion valve (8).

21 Claims, 6 Drawing Sheets

REGULATING MECHANISM FOR THE REFRIGERANT FLOW TO THE EVAPORATOR OR REFRIGERATING SYSTEMS OR HEAT PUMPS AND EXPANSION VALVES ARRANGED IN THE REFRIGERANT FLOW

The invention is directed to a regulating mechanism for the refrigerant flow to the evaporator of refrigerating systems or heat pumps.

In typical known regulating mechanisms the expansion valve is controlled thermostatically, for example, in such a way that a diaphragm serving to actuate the closing member of the expansion valve is acted upon on one side by the refrigerant pressure of the system occurring prior to or subsequent to the evaporator and, on the other side, by means of a fluid which changes its volume or its pressure as a function of temperature by means of a temperature sensing device which is arranged subsequent to the evaporator with heat conducting contact. The diaphragm accordingly moves in one direction or the other, depending on whether a higher pressure occurs at one side or the other. The regulating movement, which is executed in this way, in turn causes a change of the free through-flow cross section (throttle cross section) and accordingly causes a change of the mass flow. Moreover, there are also arrangements in which the fluid is heated to a greater or lesser degree on one side of the diaphragm by means of an electric heating device in order to alter the pressure of the fluid or its volume.

In such regulating mechanisms the expansion valves must be adapted to the respective refrigerants which are used, i.e. the manufacturers are compelled to provide a multitude of similar devices. In order to achieve favorable regulating characteristics, moreover, it is necessary to adjust the expansion valve to the respective system as accurately as possible with respect to the through-flow cross section. Moreover, the capillary lines, which are customarily arranged between the sensing devices and the expansion valve, cannot be arranged at desired lengths.

Finally, the reaction time and response behavior of the expansion valve cannot be subsequently adapted to the reaction time behavior of different systems; instead, the desired reaction time behavior must be taken into account already in the planning stage of the system by means of expansion valves which are constructed differently.

Therefore, it is the object of the invention to provide a control mechanism which permits a particularly flexible adaptation to different conditions of use and also, in particular, to refrigerating systems with differing capacities, at a low constructional cost.

This object is met in that the expansion valve can be regulated as a function of a set value by means of a computer which controls the - preferably electric - actuating motor of the expansion valve as a function of the signals from sensors which are sensitive to temperature, these sensors being arranged on the input side and output side of the refrigerant line of the evaporator.

Since the computer can be reprogrammed at any time, the control of the respective expansion valve can be adapted to practically any conceivable operating conditions without having to change the valve construction. Accordingly, a single type of valve can be used in a practically universal manner. Since the control is effected in dependence on sensors which are sensitive to temperature, no branching or openings need be provided in the refrigerant circulation system. Moreover, commercially available sensing devices can be used as sensors, for example, those which generate electrical voltage as a function of temperature by means of thermoresistors and can accordingly also be connected with the computer, if necessary, via very long electrical signal lines which can accordingly be arranged practically as desired. This provides the further advantage that a computer which is already present for other purposes, for example, a process computer for controlling an entire refrigerating system or the like, can possibly also be employed for controlling the expansion valve.

According to a preferred embodiment form, in case the input temperature at the evaporator lies below a first threshold value, it is provided that the computer controls the expansion valve such that the opening increases when the difference between the input temperature and the output temperature in the evaporator exceeds a set value or such that the closing increases when the difference falls below the set value. Since the temperature difference between the input and output in a given system represents information about the filling ratio of the evaporator (a small temperature difference is effected by an excess mass flow, a large temperature difference is effected by a small mass flow), this signal can be used as input value (regulating value) of the regulating mechanism.

Moreover, it is advisably provided that the computer first controls the expansion valve so as to effect a complete closure when the input temperature at the evaporator lies above a second threshold value. In this manner of control it is taken into account that a vapor having high density and high pressure, which leads to a correspondingly high pressure on the suction side of the compressor, is present in the evaporator after an extended stoppage of a refrigerating system because of the comparatively high evaporator temperature which is then present and which can possibly correspond to the ambient temperature. If the refrigerating system is now put into operation the motor which drives the compressor must perform considerable compression work because the compression of high-density vapor requires substantially greater output than the compression of vapors with lower density. The phase of high output requirement for the compressor can now be substantially shortened by means of the invention, since no additional refrigerant can flow into the evaporator because of the expansion valve which is kept closed for the time being.

After an extended stoppage of a refrigerating system a modified manner of control, in which the expansion valve is briefly opened repeatedly, can possibly also be advisable, wherein a control by means of pulse width modulation is preferred. But, instead of this, an analog control with an expansion valve which is somewhat open over an extended period is also possible. When the expansion valve is repeatedly opened for a brief period and when it is continuously open its control is first effected solely as a function of the evaporator input temperature. This manner of control is particularly advantageous when the quantity of vapor found in the evaporator is relatively small in comparison to the output of the compressor. If, in such a case, the expansion valve were kept closed for an extended period of time the compressor could evacuate the evaporator to the extent that the continued work of the compressor could not bring about any additional pressure drop or additional temperature reduction in the evaporator. With regard to an attempted lowering of the temperature in the evaporator as quickly as possible after a stoppage of the refrigerating system, it is advantageous in such cases to supply the evaporator with additional refrigerant by means of briefly opening the expansion valve.

In the aforementioned operating phases with closed expansion valves or expansion valves which are opened somewhat or repeatedly for a brief time, temperature differences must necessarily occur between the input and output temperatures of the evaporator which clearly exceed the set value indicated above. For this reason, it is advisable to provide a special type of operation between the operating phase when the evaporator input temperature is above a threshold value and the operating phase with valve control as a function of the difference between input and output temperatures at the evaporator.

During this special type of operation, which is provided when the evaporator input temperature is in the vicinity of the threshold value, the expansion valve is controlled exclusively as a function of the evaporator input temperature, specifically in such a way that the evaporator input temperature remains approximately constant or decreases only slightly and the evaporator output temperature simultaneously approximates the evaporator input temperature. This special type of operation is terminated as soon as the evaporator output temperature has reached a value which is just, e.g. 2° K. under the evaporator input temperature and/or the evaporator input temperature has dropped to a second threshold value which is relatively just, e.g. 2° K. under the first threshold value.

In order to adapt the control to different refrigerating systems in the simplest possible manner it is provided, according to another preferred embodiment form of the invention, to arrange at the computer a preselection switch, for example, in the form of a potentiometer and advisably with closely stepped graduation, for setting and adjusting the set value for the difference between the input and output temperatures and/or at least one other such switch for setting and adjusting at least one of the threshold values mentioned. In addition, or as an alternative, the computer can also have preferred or privileged digital inputs for presetting the set and/or threshold value by means of an overriding computer.

Moreover, additional preferred inputs can be provided at the computer.

In so doing, such a preferred input can be excitable by means of switching the compressor on or off, respectively, with the result that the computer controls the expansion valve in such a way that it is completely closed when the compressor is stopped. In such an arrangement there is no need for separate stop valves, which in previous refrigerating systems are often arranged in series with the expansion valve and are simultaneously opened when the compressor is switched on or closed when the compressor is switched off.

Another preferred input can be excited when the evaporator is to be defrosted, i.e. during the so-called defroster operation. In the event that the evaporator is defrosted by means of a separate electric or other heating device, the computer can control the expansion valve in such a way that it is completely closed. If, on the other hand, the evaporator is defrosted by means of so-called hot gas defrosting or operated in reverse operation for the purpose of de-icing, the computer controls the expansion valve in such a way that it is completely opened.

The computer advisably works as a so-called proportional plus integral control unit with adjustable proportional and/or integral portion. In so doing, a digital computer is preferred, i.e. the temperature-dependent output voltages of the sensors are fed to the computer in a digitalized manner by means of corresponding analog to digital conversion, wherein the analog to digital convertors can be arranged directly as a part of the computer on the one hand or as separate members of the sensors on the other hand.

In order to facilitate inspection or adjustment work the computer can have measurement outputs at which a signal can be taken off which gives the input and/or output temperature or, very generally, the measurement values determined by the sensors which serve to control or regulate the refrigerating system or heat pump, for example, a temperature-proportional voltage. Accordingly, it is sufficient to connect an electric measuring device, for example a voltmeter, to the computer and, accordingly, under certain circumstances, at a greater distance from the refrigerating system, whose reading then directly shows the measurement value, for example a temperature.

Finally, it is preferably provided that the computer comprise outputs for status readings, particularly for lights which are arranged as status readings, for example light emitting diodes or the like, which are excitable, for example, when the actuating motor and computer are supplied with their supply voltage, the expansion valve opens or closes, the "defrost" signal is present at the computer and/or errors occur at the sensors or their lines or in the electronic arrangement.

It is preferable that an electric motor be provided as actuating motor, particularly a two-phase bipolar stepping motor whose rotational movement is converted into a linear movement in a preferred manner in such a way that the motor is supported in a housing so as to be axially displaceable but nonrotatable and drives a threaded portion which is connected with the motor shaft and is arranged in or at a counterthread portion so as to be displaceable by means of screwing, the counterthread portion being arranged so as to be stationary; and when the motor is running the threaded portion accordingly moves together with the motor in one direction or the other, according to its rotational direction, in order to directly drive the closing member of the expansion valve or is constructed as a differential screw gear unit in order to indirectly drive same with another threaded portion.

The closing member of the expansion valve is advisably sealed outwardly by means of an accordion seal. Accordingly, it is possible to attach the actuating motor, together with the actuating member which actuates the closing member, at the valve housing as a detachable unit and to exchange it, if necessary, without opening the refrigerant circulation system.

In this connection, moreover, it is preferably provided that the actuating motor be arranged in a tight housing which is tightly connectable with the valve housing so that the actuating drive can not be blocked by freezing condensation water.

The stepping motor, already mentioned, is particularly preferred as actuating motor because the expenditure on the electronic arrangement can be substantially reduced through its use. An electric stepping motor is controlled with electrical pulses, generally rectangular pulses, wherein, during each pulse, the motor executes a regulating movement of preset magnitude in one direction or the other, according to the type of pulse. Accordingly, the number of pulses determines the total adjusting path, while the time sequence of the pulses determines the adjusting speed. Separate elements for monitoring the adjusting path or the adjusting speed are accordingly not needed. Particularly preferable is an arrangement in which it is possible to control the closing member of the expansion valve in multiple steps and, accordingly, in a precise manner by means of the stepping motor, i.e. the closing member of the expansion valve executes a relatively small stroke during each movement step of the stepping motor. Accordingly, a particularly sensitive influencing of the refrigerant flow in the expansion valve is also possible in the partial load range when the closing member releases only a small portion of the maximum opening cross section which is structurally possible according to the valve construction. This provides the additional advantage that the expansion valve can be used for different refrigerants without structural modification. The usability of an expansion valve is accordingly practically independent of the type of respective refrigerant.

The use of the widest range of computers, and possibly already existing computers, for regulating the refrigerating system is substantially facilitated when an electronic control unit which belongs to the motor, is arranged as an interface between the computer and the actuating motor and is able to process conventional digital input signals is accommodated in or at the housing of the actuating motor.

Figure 2:
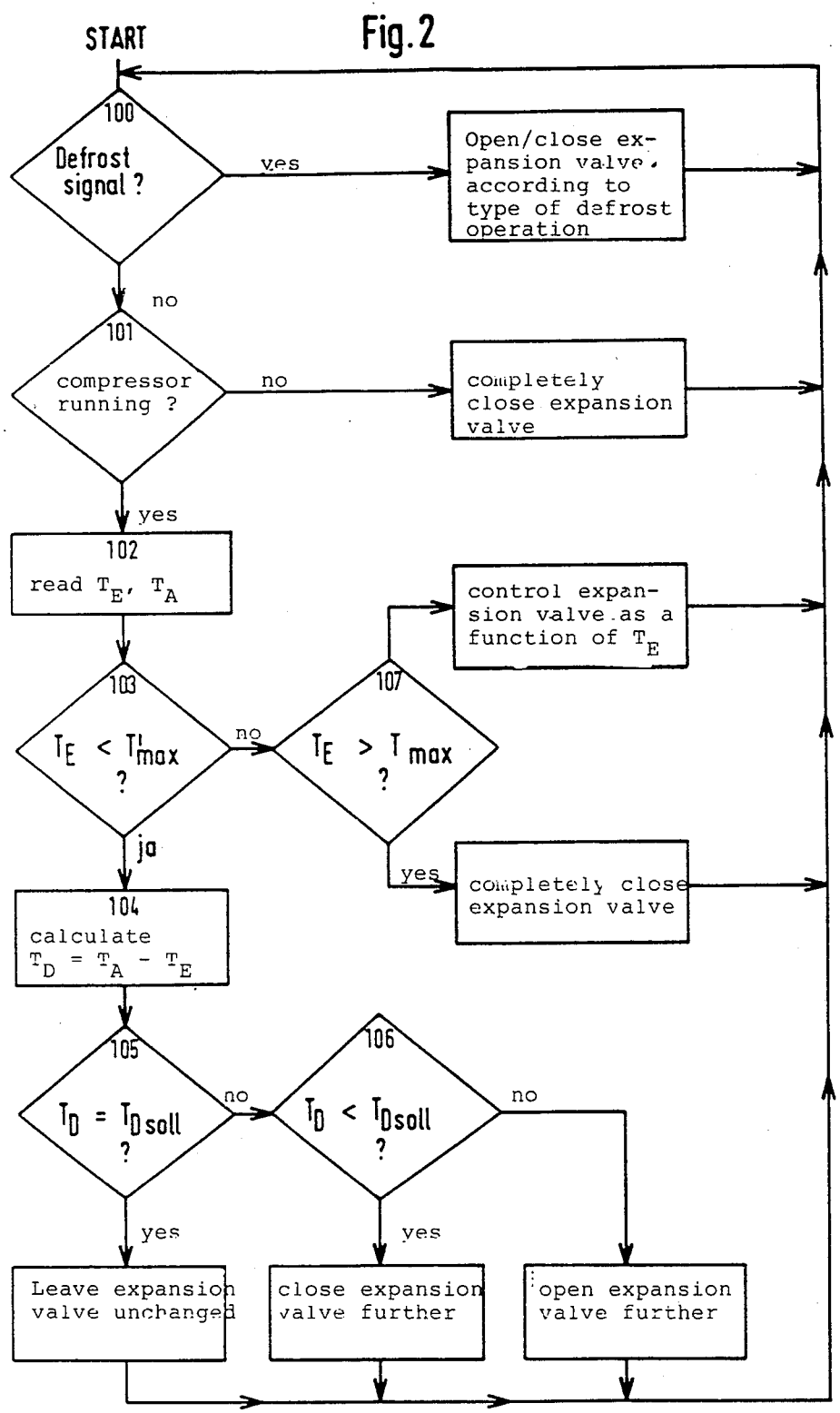
Figure 3:
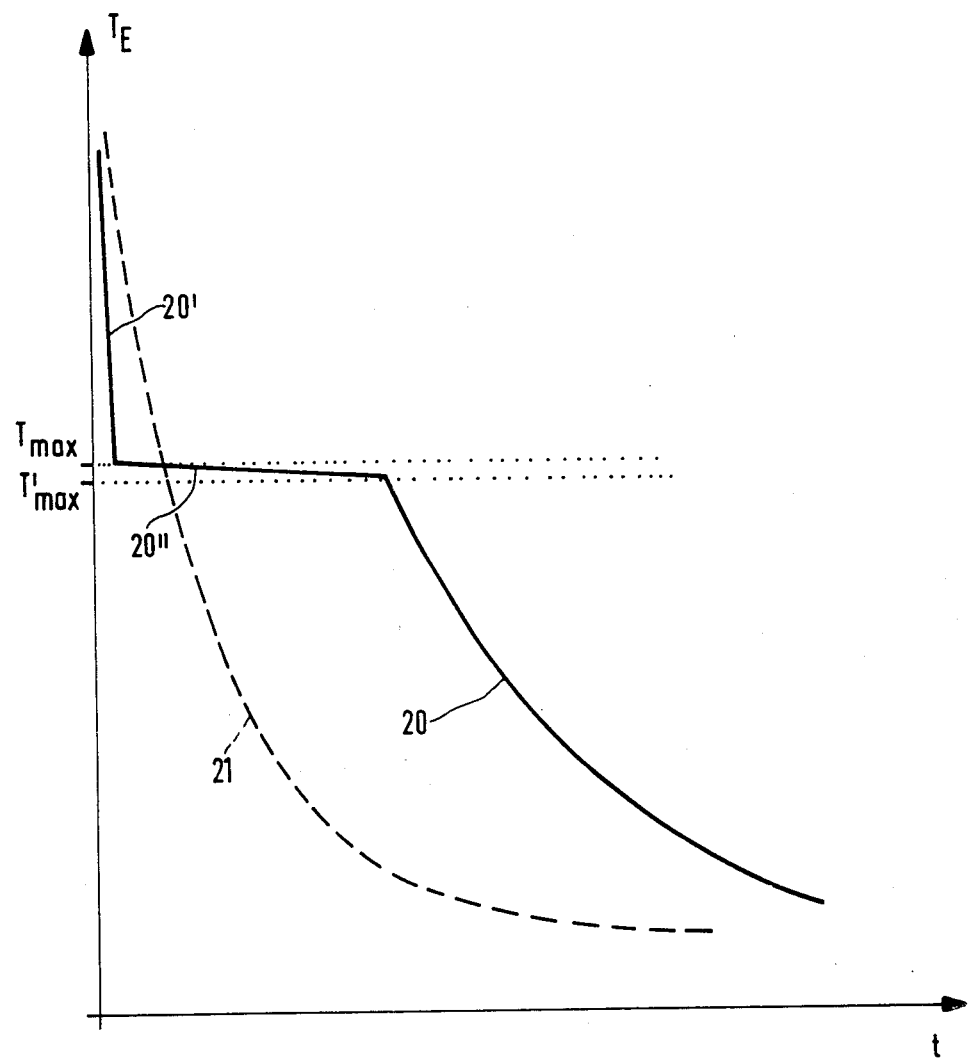
Figure 4:
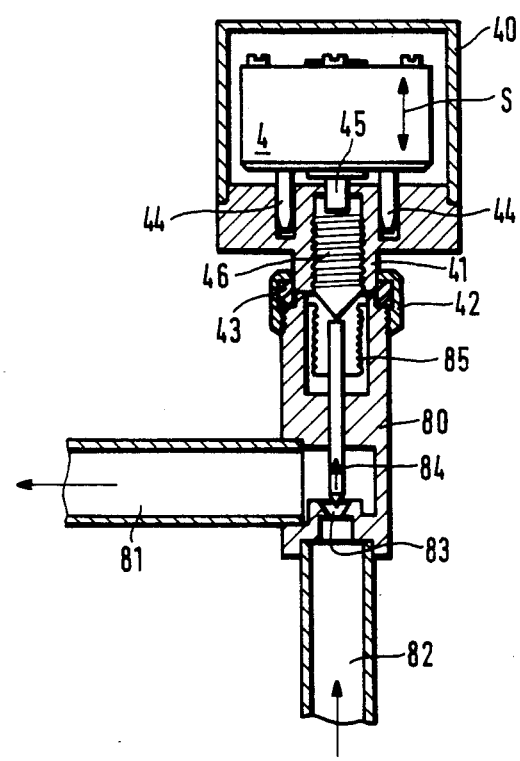
Figure 5:
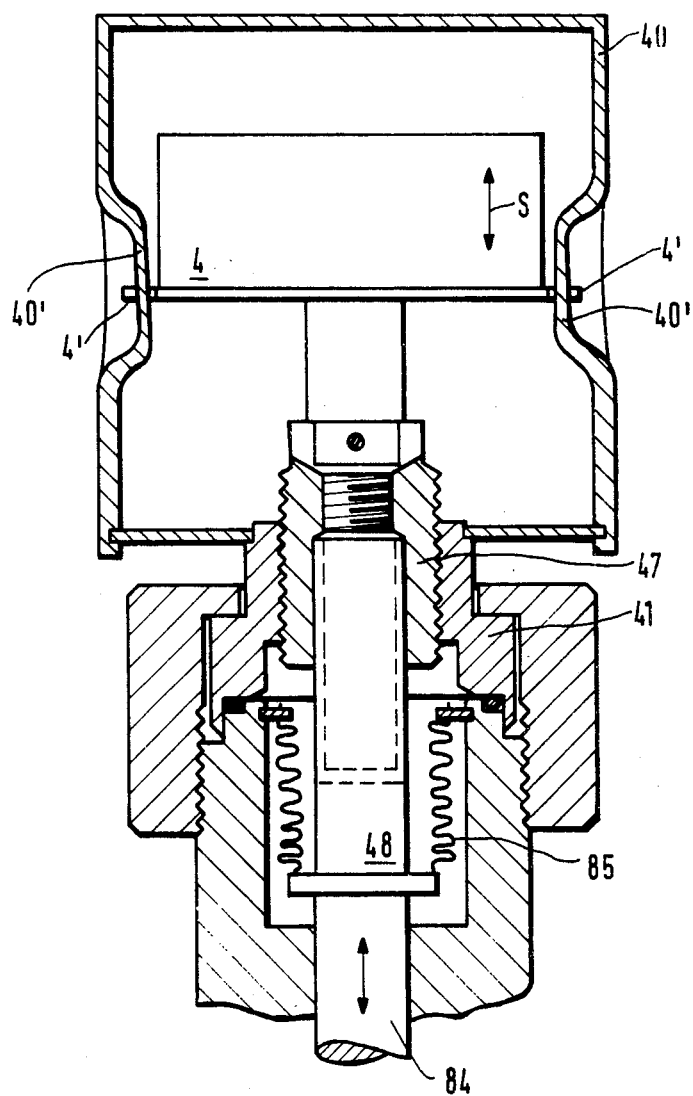
Figure 6:
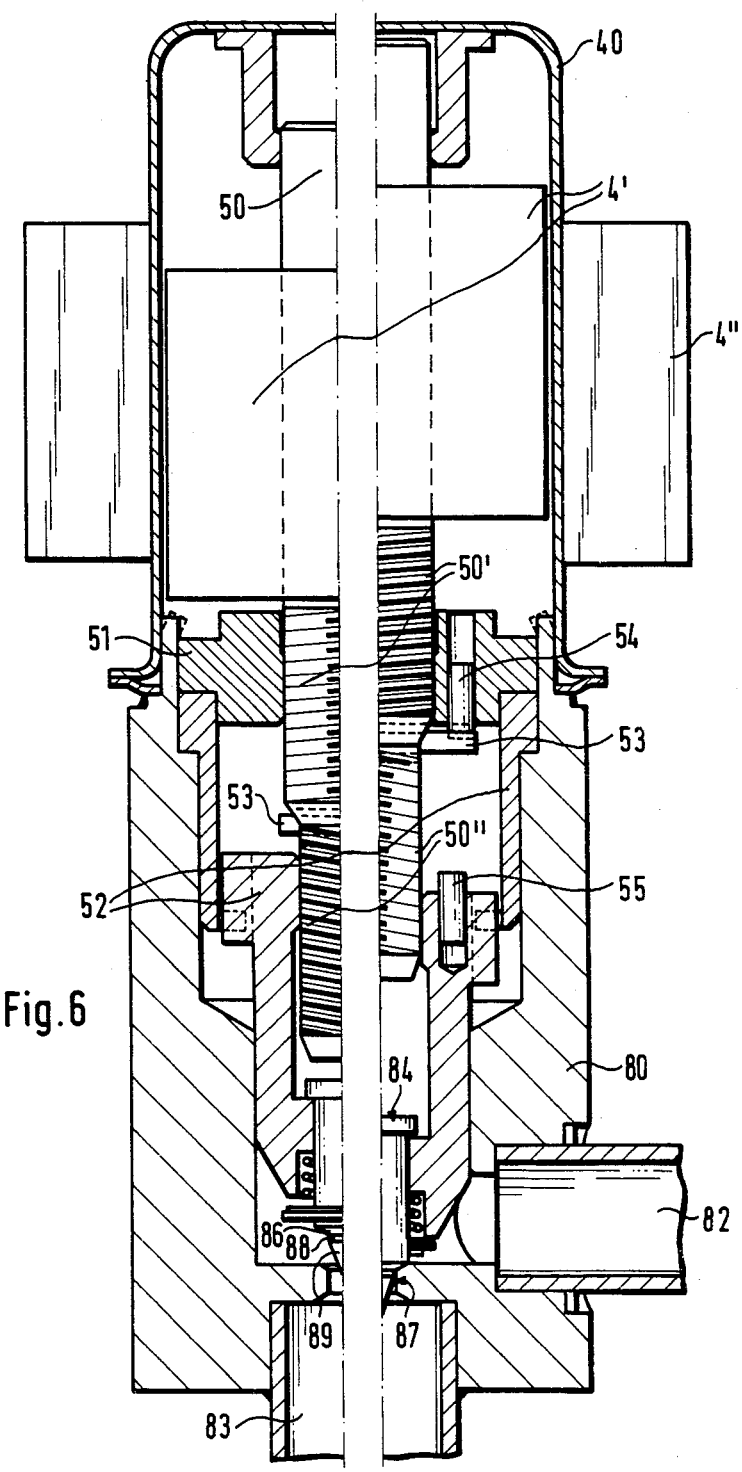

In addition, with respect to preferred characteristic features of the invention, reference is made to the subclaims and the following description, in which the invention is explained in more detail with the aid of the drawing, in which preferred embodiment forms of the invention are shown. Shown are:

FIG. 1 a block diagram of a heat pump comprising a regulating device according to the invention, FIG. 2 a data flow chart for the purpose of illustrating the computer work, FIG. 3 a diagram which represents the evaporator input temperature as a function of the running time t of the compressor, FIG. 4 a slightly schematic section diagram of the expansion valve together with the respective actuating motor, FIG. 5 a section diagram of another expansion valve and FIG. 6 a section diagram of a third embodiment form for the expansion valve.

According to FIG. 1, the refrigerating system consists substantially of a refrigerant circulation system with a compressor 1, a condenser 2 arranged on the pressure side of the latter, and an evaporator 3 arranged on the suction side of the compressor, the input of the evaporator 3 being connected with the output of the condenser 2 via an expansion valve 8, which is controlled by means of an actuating motor 4, and a collector 7 for condensed refrigerant, which is connected between the expansion valve 8 and the condenser.

Temperature sensing devices 5 and 6, each of which generates an electric voltage with a level which is dependent on the measured temperature, are arranged at the input and output of the evaporator. These voltages are converted into digital input signals $T_E$ or $T_A$ for a computer 10 by means of an analog to digital convertor 9 and are fed to the computer 10 as input signals.

The computer 10 receives set values $T_{Dsoll}$ for the temperature differential $T_D = T_E - T_A$ from a set value transmitter 11 which can be set or adjusted, respectively. In addition, the set value transmitter 11 can also, if necessary, provide additional set values for special operating phases and/or threshold values—preferably in a variable manner. Moreover, the computer 10 comprises preferred inputs which serve for the input of signals which, in turn, show whether the motor 12 of the compressor 1 is running and/or whether a defroster operation for defrosting the evaporator 3 is switched on.

The computer 10 controls or regulates the actuating motor 4 as a function of the input signals in that corresponding output signals are sent from the computer to an electronic control arrangement 13 which is connected prior to the actuating motor 4.

The computer 10 preferably works digitally; all input and output signals of the computer 10 are accordingly digitalized.

According to FIG. 2, the computer 10 first checks at position 100 whether a defroster operation for defrosting the evaporator is switched on. If this is the case, the expansion valve is either opened or closed, depending on the manner in which the evaporator is heated during the defroster operation for defrosting. If the heating is effected by means of a separate heating device, which is generally electrical, the expansion valve is closed. If the heating of the evaporator is effected in that the evaporator is connected directly to the pressure side of the compressor 1 by means of a corresponding adjustment of the reversing valves (reverse operation), which are not shown in FIG. 1, the expansion valve 8 is opened in order to make possible a flow direction which leads from the evaporator 3 to the condenser 2 and is the opposite of the normal cooling operation and during which the evaporator takes over the function of the condenser and is correspondingly heated, while the condenser works as an evaporator and cools.

In the same manner, the expansion valve 8 is opened during hot gas defrosting, in which the pressure side of the compressor 1 is connected directly with the input of the expansion valve 8 by means of adjusting the reversing valves.

The computer 10 then checks, in accordance with position 101, whether the compressor 1 or its motor 12 are running. During a stoppage the expansion valve 8 is closed.

If the defrosting operation is not switched on and the compressor 1 is running, the signals $T_E$ and $T_A$, which are generated by the temperature sensing devices 5 and 6 and which show the input and output temperature at the evaporator 3, are read according to position 102.

Immediately afterward, position 103 is checked as to whether the input signal $T_E$ is smaller than a first threshold value $T'_{max}$. If this is the case, the difference $T_D$ between the input signals $T_E$ and $T_A$ is calculated according to $T_D = T_A - T_E$ and compared with a set value T.

In addition, position 105 is checked as to whether $T_D$— within a pregiven interval—agrees with $T_{Dsoll}$. If this is the case, the actuating motor 4 of the expansion valve is not actuated, i.e. the position of the expansion valve remains unchanged.

If $T_D$ and $T_{Dsoll}$ do not sufficiently agree position 106 is checked as to whether $T_D$ is smaller (or greater) than the set value $T_{Dsoll}$. If this is the case, i.e. $T_D$ is lower than its set value, the actuating motor 4 of the expansion valve 8 is controlled in such a way that it opens the latter. In the other case, i.e. if the value of $T_D$ lies above the respective set value, the actuating motor 4 of the expansion valve 8 is controlled in such a way that the latter is increasingly opened.

If it should be shown at position 103 that the input temperature $T_E$ is not smaller than the indicated threshold value $T'_{max}$, 107 is checked first as to whether $T_E$ lies above another threshold value $T_{max}$, which is somewhat greater than $T'_{max}$ (for example, the difference lies between $T_{max}$ and $T'_{max}$ at 2° K.). If this is the case, the actuating motor 4 of the expansion valve 8 is controlled such that it completely closes.

If the input temperature $T_E$ is above $T'_{max}$ the refrigerating system must have been stopped over an extended period. By means of the complete closing of the expansion valve 8 while the compressor 1 is running, which is now effected first, the compressor can eliminate as quickly as possible the high-density and high-pressure vapor which is present in the evaporator after an extended stoppage without having to perform a particularly considerable compression work over an excessively long period of time. As the vapor is conducted out of the evaporator 3, the temperature in the evaporator 3 simultaneously drops sharply.

But if the output of the compressor 1 is extraordinarily great in comparison to the vapor quantity in the evaporator 3 it may happen, when the expansion valve 8 remains closed, that the compressor 1 evacuates the evaporator 3 to the greatest extent possible and the continued work of the compressor cannot lead to any additional change in pressure or temperature in the evaporator. In such refrigerating systems it is advisable to open the expansion valve 8 briefly or repeatedly for a brief period, respectively, wherein the control of the expansion valve 8 is preferably effected by means of pulse width modulation with an opening coefficient which is dependent on the input temperature $T_E$. By means of this, the evaporator 3 is supplied with additional refrigerant which is then guided away from the compressor 1, accompanied by the reduction of pressure and temperature in the evaporator 3. Instead of a repeated brief opening, the expansion valve 8 can also be opened slightly over an extended period of time. Here, as well, the control of the opening coefficient is preferably effected as a function of $T_E$.

If the input temperature $T_E$ lies at $T_{max}$ or between $T_{max}$ and $T'_{max}$, respectively, a control or regulating of the actuating motor 4 of the expansion valve 8 is effected exclusively as a function of the input temperature or the corresponding signal $T_E$ in such a way that the evaporator input temperature $T_E$ remains virtually constant and drops only gradually, while the evaporator output temperature $T_A$ approaches $T_E$. As soon as $T_E$ lies below the first threshold value $T'_{max}$ and/or when $T_A$ has sufficiently approximated $T_E$, the signal processing, which was already described above, is effected in accordance with positions 104 to 106.

After implementing the described signal processing, the same process is repeated, wherein, because of the expansion valve 8 which is now adjusted, as a rule, changed values of $T_E$ and $T_A$ are now processed.

The course of the evaporator input temperature with respect to time or of the signal $T_E$ which shows the latter, which are shown in FIG. 3, results because of the described signal processing. In addition, a corresponding curve of the input pressure at the evaporator 3 also results, since pressure and temperature at or in the evaporator change simultaneously and in the same direction.

The curve showing the course of the input temperature comprises portions 20, 20' and 20". If $T_E$ has a very high value then it decreases very quickly and very sharply when the compressor 1 is running because the expansion valve 8 is opened or closed only slightly, according to the above statements, as long as $T_E$ lies above the threshold value $T_{max}$. According to the sharp temperature drop in area 20' of the curve, the refrigerant pressure also drops on the suction side of the compressor so that the latter need work only briefly in the range of high suction vapor density.

As soon as $T_E$ has dropped to the threshold value $T_{max}$, the expansion valve 8 is opened, wherein the opening cross section is regulated as a function of the evaporator input temperature and, accordingly, as a function of the signal $T_E$, wherein $T_E$ decreases only gradually or remains approximately constant for a certain period of time. Above all, this operating phase serves to reduce the difference $T_D$, which has increased in the operating phase by portion 20'.

As soon as $T_E$ has decreased to the other threshold value $T'_{max}$, or if a certain difference, e.g. 2° K., has come about between the evaporator input temperature $T_E$ and the evaporator output temperature $T_A$, the continued regulating of the expansion valve 8 is effected as a function of the set value, i.e. as a function of the temperature difference $T_D$ between $T_A$ and $T_E$. In so doing, $T_E$ decreases in accordance with a curve portion 20. In one operating phase the expansion valve 8 is controlled in such a way that it opens increasingly when the temperature difference $T_D$ exceeds a set value, or in such a way that it closes increasingly if $T_D$ is less than the set value. When $T_D$ agrees sufficiently with the set value, the expansion valve stays in its respective position.

The curve 21 shows the relations which result when the regulating of the expansion valve 8 is carried out exclusively as a function of the temperature difference $T_D$. It can be seen that the compressor 1 would have to work for a relatively long period of time at a relatively high evaporator input temperature and, accordingly, at a high pressure on the suction side.

The expansion valve 8 shown in FIG. 4 has a valve housing 80 with an input 82, which is connected with the collector 7 (cf. FIG. 1), and an output 81 leading to the evaporator 3, wherein the input and output lines, as shown, form an approximately right angle. A nozzle-shaped opening 83, whose opening cross section is controllable by means of a needlelike closing member 84 and can be completely blocked if necessary, is arranged between the input 82 and the output 81. The closing member 84 is displaceably supported in a borehole of the valve housing 80, which is approximately coaxial relative to the input line, and is outwardly sealed on the outside of this borehole by means of an accordion seal 85, which is tightly connected with the closing member 84 on one hand and with the valve housing 80 on the other. The closing member 84 penetrates the accordion seal 85 in such a way that one end of the closing member 84 remote of the opening 83 is accessible for the purpose of adjustment. The actuating motor 4 is arranged in a housing 40, which is arranged, in the manner shown, in continuation of the closing member 84 by means of a connection piece 41 and a sleeve nut 42 and with the intermediary of a seal 43. The housing 40 is advisably constructed so as to be impervious to gas and vapor so that no moisture can penetrate and possibly freeze when the housing 40 cools corresponding to the valve housing 80.

The actuating motor 4 is supported within the housing 40 so as to be axially displaceable corresponding to the double arrow S, but nonrotatable, in that one or two pins 44, which are arranged at the motor, are displaceably inserted so as to be displaceable in pocket boreholes of a base of the housing 40. The drive shaft 45 of the motor 4 is immediately connected with a screw spindle 46, which is arranged in a counterthread within the connecting piece 41 so as to be displaceable by means of screwing. Thus, when the screw spindle 46 is rotated by means of the motor 4, the spindle 46, as well as the motor 4, moves upward or downward according to the double arrow S, wherein the closing member 84, which contacts the tip of the screw spindle 46, executes a corresponding movement, accompanied by a change of the free cross section of the opening 83.

The electronic control arrangement (not shown) of the motor 4 is advisably accommodated at or in the housing 40 so that no additional interface circuits need be arranged in order to convert the digital output signals of the computer 10 into regulating signals suitable for controlling the motor 4.

The embodiment form according to FIG. 5 corresponds substantially to the construction as shown in FIG. 4. In contrast to this, the actuating motor 4 here is guided so that it can be raised and lowered in the arrow direction S, but so as to be nonrotatable, in that at least one bulge is arranged at the housing 40 in the form of a vertical rib 40' which cooperates with guide cams 4', or the like, at the actuating motor 4. In addition, instead of the screw spindle 46, a screw sleeve 47 is provided which comprises both an external and an internal thread. The sleeve 47 is guided in the connecting piece 41 with the external thread in the same manner as the screw spindle 46 so as to be displaceable by means of screwing. The internal thread has a rotational direction corresponding to the external thread, i.e. the external and internal threads are both either right-handed or left-handed, wherein the steepness of the internal thread differs from the steepness of the external thread. The internal thread cooperates with a threaded rod 48 which is arranged as a portion of the closing member 84 or is securely connected with the latter, respectively. This threaded rod 48 is held together with the closing member 84 so as to be nonrotatable, but axially displaceable, by means of the accordion seal 85.

Because of the described thread arrangement, the screw sleeve 47, for example, moves in the downward direction relative to the connecting piece 41 when the actuating motor 4 is running, while the threaded rod 48 moves in the upward direction relative to the screw sleeve 47. Accordingly, the adjusting path of the closing member 84 results as the difference between the adjusting path of the screw sleeve 47 relative to the connecting piece 41 and the adjustment path of the threaded rod 48 relative to the screw sleeve 47. Accordingly, the possibility is provided of using thread of greater steepness and greater carrying force; however, a high transmission ratio can be achieved, i.e. a relatively large rotational stroke of the actuating motor 4 is necessary for a relatively small adjusting stroke of the closing member 84.

In the expansion valve which is shown in FIG. 6, the housing 40 encloses only the rotor 4' of the actuating motor 4, while the stator 4" of same is arranged externally on the housing 40. In order to ensure the magnetic coupling between the rotor 4' and the stator 4", which is necessary for the electric motor, the housing 40 in this embodiment form must consist of a non-magnetizable material.

Together with the valve housing 80, the housing 40 forms a gastight enclosure which communicates with the input 82 of the valve housing 80 and, accordingly, with the refrigerant system, i.e. practically the same pressure prevails within the above-mentioned enclosure as at the input 82. This arrangement achieves the advantage that the actuating motor 4 need not work against the pressure of the refrigerant system. That is, the forces which act on the closing member 84 in the opening and closing directions and are caused by the pressure of the refrigerant system compensate one another reciprocally to the greatest extent. An actuating motor 4 with low output is accordingly sufficient.

In addition, this arrangement also achieves the advantage that no electrical lines need be introduced in the enclosure formed by the housing 40 and the valve housing 80.

The rotor 4', which is accommodated in the enclosure, and the elements serving for the drive connection of the rotor 4' with the closing member 84, can be provided with a permanent lubrication so that any additional lubrication during the life of the refrigerant system is unnecessary. Moreover, the refrigerants normally also contain oil for the permanent lubrication of the compressor 1. Together with the refrigerant, this oil also penetrates into the enclosure formed by the housing 40 and the valve housing 80 so that a sufficient lubrication can also be ensured in this manner.

The shaft 50 of the rotor 4' is radially and, accordingly, axially displaceably supported at its end, which is at the top in the drawing. Beneath the rotor 4' the shaft 50 is supported with a thread 50' in a corresponding threaded borehole of a stationary bearing part 51 so that the shaft 50 and the rotor 4' are displaced in an upward or downward direction during rotation in the axial direction, according to the rotational direction. Another threaded portion 50", whose pitch is greater than that of the threaded portion 50' is arranged beneath the latter.

The threaded portion 50" cooperates with the internal thread of a sleeve portion 52 which is guided in the valve housing 80 so as to be nonrotatable but axially displaceable. At its lower end this sleeve portion 52 carries the closing member 84, which is guided in the sleeve portion 52 in a telescopic manner and is acted upon by means of a spring (at bottom in the drawing). When the shaft 50 rotates in a rotational direction in which a downward axial displacement of the shaft 50 and the rotor 4' is effected, the sleeve portion 52 moves in an upward direction together with the closing member 84, i.e. the valve opens. During an opposite rotational direction of the rotor 4' the sleeve portion 52 moves downward, together with the closing member 84, to close the valve.

The closing position is shown in the right half of FIG. 6, while the left half shows an opening position.

A pin 53 is arranged radially at the shaft 50 and cooperates with stop pins 54 or 55 at the bearing portion 51 or at the sleeve portion 52 when the valve is completely opened or closed, the stop pins 54 or 55 being arranged parallel to the shaft 50. The threads of the shaft 50 and of the bearing portion 51 or the sleeve portion 52 are accordingly prevented from jamming or becoming detached. If necessary, the stop pins 54 and 55 can be arranged in a multiple manner.

The closing member 84 has an annular sealing surface 86 which is constructed in the manner of the outer surface area of a truncated cone and which cooperates with a correspondingly constructed sealing surface of the valve seat 87. A cylindrical portion 88, which has a slightly smaller diameter than the cylindrical borehole adjoining the sealing surface of the valve seat 87 at the bottom, adjoins the sealing surface 86 at the bottom. The axial length of the cylindrical portion 88 is, as shown, clearly smaller than the axial length of the above-mentioned cylindrical borehole. At the bottom, the cylindrical portion 88 is continued by means of a cone 89. The described construction of the closing member 84 and valve seat 87 is advantageous because when the valve is slightly open a throttle effect occurs which is pronounced and controllable in a favorable manner by means of axial displacement of the closing member 84 when the sealing surface 86 of the closing member 84 has been raised only slightly from the respective sealing surface of the valve seat 87. Moreover, it is advantageous that the flow cross section in the area between the closing member 84 and the valve seat 86 in the direction of flow first be continuously narrowed in the manner of a Laval nozzle and then continuously widened. By means of this a low-noise flow can also be achieved during high flow rates. Moreover, a considerable tightness of the valve in the closing position is ensured because of the large sealing surfaces of the closing member 84 and valve seat 87.

We claim:

1. Regulating mechanism for the refrigerant flow to the evaporator of refrigerating systems or heat pumps with a compressor, which is arranged in the refrigerant circulation system and is connected or connectable, respectively, with the input of a condenser on the pressure side and with the output of an evaporator on the suction side and which is connectable with the output of said condenser or of a collector on the input side thereof via and expansion valve, an actuation motor for controlling the opening coefficient of said expansion valve, said output of the condenser being directly connected to said expansion valve or arranged as the output of said condenser, comprising a computer (10) for controlling said actuating motor (4) of the expansion valve (8) as a function of set values and as a function of the signals from sensors (5,6), which are sensitive to temperature and are arranged on a refrigerant line at the input and output sides of said evaporator (3) to indicate an input temperature ($T_E$) and an output temperature ($T_A$), said computer controlling the actuating motor such that in the event the input temperature ($T_E$) at said evaporator lies below a threshold value, said expansion valve increasingly opens when the difference between the input and output temperature ($T_E, T_A$) at said evaporator exceeds a set value or such that said expansion valve increasingly closes when the difference falls below said set value, and closes completely when said input temperature signal ($T_E$) lies above a threshold value.

2. Expension valve of a refrigerating system or heat pump with actuating motor for controlling the valve opening coefficient, particularly for use in combination with a regulating mechanism according to claim 1, comprising an electric stepping motor arranged as said actuating motor for the incremental change of the opening coefficient, said expansion valve, together with the rotor of the electric motor and the drive connection between said rotor and a closing member of said expansion valve, being enclosed in a gastight manner in a housing assembled of a motor housing portion and a valve housing portion, said drive connection including a sleeve slidably arranged in said valve housing portion and supporting said closing member, the interior of said valve housing portion communicating with refrigerant circulation system controlled by said expansion valve, and the stator of said electric motor being arranged externally on said motor housing portion consisting of non-magnetizable material which encloses said rotor.

3. Expansion valve according to claim 1, wherein said actuating motor is a two phase bipolar stepping motor.

4. Regulating mechanism according to claim 1 wherein said computer (10) controls said expansion valve (8) first in such a way that it closes completely when said input temperature ($T_E$) at said evaporator (3) lies above a threshold value ($T_{max}$), and then opens it in a controlled manner, in particular, briefly or repeatedly for a brief period, when, in spite of running compressor, said input temperature ($T_E$) decreases more slowly than preset by said computer or more slowly than expected, respectively, or when said threshold value ($T_{max}$) of said input temperature is not achieved after a period of time which can be preset.

5. Regulating mechanism according to claim 4, wherein said expansion valve (8) is opened in accordance with pulses and is controlled by means of pulse width modulation.

6. Regulating mechanism according to claim 5, wherein when said input temperature ($T_E$) at said evaporator (3) approaches a threshold value ($T_{max}$), or lies between two adjacent threshold values ($T_{max}, T'_{max}$) said computer (10) controls said expansion valve (8) exclusively as a function of said input temperature ($T_E$) in such a way that said input temperature ($T_E$) remains practically constant or decreases only slightly and the output temperature ($T_A$) at said evaporator (3) approximates the input temperature.

7. Regulating mechanism according to claim 6, wherein a preselection switch for setting or adjusting the set value, particularly for the difference between the input and output temperatures are said evaporator (3), is arranged at said computer (10).

8. Regulating mechanism according to claim 7, wherein switches for setting or adjusting threshold values ($T_{max}, T'_{max}$ are arranged at said computer (10).

9. Regulating mechanism according to claim 8, wherein said computer has preferred digital inputs for preset set and/or threshold values by means of an overriding computer.

10. Regulating mechanism according to claim 9, wherein said computer works as a proportional plus integral control unit with an adjustable proportional and/or integral portion.

11. Regulating mechanism according to claim 10, wherein said computer (10) has an input which is excitable by means of switching said compressor (1) on or off and controls said expansion valve (8) such that is closes completely when said compressor (1) is stopped.

12. Regulating mechanism according to claim 11, wherein said computer (10) has an input which is activated when a defrosting operation (defroster) is switched on and opens or closes said expansion valve (8) according to the condition of the defrosting operation.

13. Regulating mechanism according to claim 12, wherein said computer (10) has measurement outputs at which a signal which gives the input and/or output temperature can be taken off, e.g. a temperature-proportional voltage or a signal giving the measurement value of said sensors (5,6).

14. Regulating mechanism according to claim 13, wherein said computer (10) comprises outputs for status readings, particularly for lights, e.g. light emitting diodes, or the like, arranged as status indications.

15. Regulating mechanism according to claim 14, wherein said actuating motor (4) is supported in a housing (40) so as to be axially displaceable but nonrotatable and directly drives a threaded portion (spindle 46) connected with the motor shaft, which threaded portion is arranged in or at a stationary counterthread portion (connecting piece 41) and drives a closing member (84) of said expansion valve (8).

16. Regulating mechanism according to claim 15, wherein said threaded portion (46), together with said closing member (84) or an element driving same, forms a differential screw gear unit (FIG. 5).

17. Regulating mechanism according to claim 16, wherein said closing member (84) of said expansion valve (8) is outwardly sealed by means of an accordion seal (85) and said actuating motor (4), together with the actuating member (spindle 46) which actuates said closing member (84), is attachable at said valve housing (80) as a detachable unit.

18. Regulating mechanism according to claim 17, wherein said actuating motor (4) is arranged in a tight housing which is tightly connectable with said valve housing (80).

19. Regulating according to claim 18, wherein an electronic control arrangement (13) arranged as an interface between said computer (10) and said actuating motor (4) is accommodated in or at said housing (40) of said motor (4).

20. Expansion valve of a refrigerating system or heat pump with actuating motor for controlling the valve opening coefficient, particularly for use in combination with a regulating mechanism according to claim 1, comprising an electric stepping motor arranged as said actuating motor for the incremental change of the opening coefficient, said expansion valve including a closing member which is enclosed in a gastight manner in a housing whose interior is connected with refrigerant circulation system controlled by the expansion valve, said housing having a cylindrical borehole provided at its top with a seat surface which in the closing state of said expansion valve fits a corresponding sealing surface on said closing member, said sealing surface transiting into a cylindrical portion which in the closing state of said valve is enclosed by said cylindrical borehole, the diameter of said cylindrical borehole and said cylindrical portion being only slightly different in order to increase the throttle effect when said expansion valve is partially opened; and the bottom of said cylindrical portion transiting into a conelike portion.

21. Expansion valve according to claim 20, wherein said sealing surface on said closing member and said seat surface of said cylindrical borehole are constructed spherically.

* * * * *

UNITED STATES PATENT AND TRADEMARK OFFICE
CERTIFICATE OF CORRECTION

PATENT NO. : 4 787 213

DATED : November 29, 1988

INVENTOR(S) : Horst Gras and Herbert Blaich

It is certified that error appears in the above-identified patent and that said Letters Patent is hereby corrected as shown below:

On the title page priority application --European 86116656 filed November 29,1986 -- should be added.

Signed and Sealed this

Sixteenth Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,787,213

DATED : November 29, 1988

INVENTOR(S) : Gras et al.

It is certified that error appears in the above-identified patent and that said Letters Patent is hereby corrected as shown below:

Title page, the following should be inserted in item [30]:

--November 29, 1986..........European..........86116645

This certificate supersedes Certificate of Correction issued May 16, 1989.

Signed and Sealed this

Third Day of April, 1990

Attest:

HARRY F. MANBECK, JR.

Attesting Officer     Commissioner of Patents and Trademarks